United States Patent
Cheng

(10) Patent No.: US 6,339,862 B1
(45) Date of Patent: Jan. 22, 2002

(54) SINGLE-HANDED FOLDING DEVICE (II)

(76) Inventor: Kenny Cheng, No. 16, Lane 47, Chih Feng St., Taipei (TW)

( * ) Notice: Subject to any disclaimer, the term of this patent is extended or adjusted under 35 U.S.C. 154(b) by 0 days.

(21) Appl. No.: 09/501,022

(22) Filed: Feb. 9, 2000

(51) Int. Cl.$^7$ .............................................. B65D 25/28
(52) U.S. Cl. .................. 16/113.1; 280/655.1; 280/658; 280/647; 190/115
(58) Field of Search ......................... 16/113.1; 190/118, 190/115, 18 A, 18 R, 117; 280/655, 655.1, 647, 657, 658, 47.371, 642

(56) References Cited

U.S. PATENT DOCUMENTS

| | | | | |
|---|---|---|---|---|
| 5,322,334 A | * | 6/1994 | Hammer ................ | 16/113.1 X |
| 5,500,981 A | * | 3/1996 | Ho ............................ | 16/113.1 |
| 5,535,483 A | * | 7/1996 | Cabagnero ................ | 16/113.1 |
| 5,630,250 A | * | 5/1997 | Chou ........................ | 16/113.1 |
| 5,694,663 A | * | 12/1997 | Tserng ..................... | 16/113.1 |
| 5,806,143 A | * | 9/1998 | Tsai .......................... | 16/113.1 |
| 5,875,520 A | * | 3/1999 | Chang ...................... | 16/113.1 |
| 5,893,196 A | * | 4/1999 | Tserng ..................... | 16/113.1 |
| 5,956,807 A | * | 9/1999 | Kuo .......................... | 16/113.1 |
| 6,026,543 A | * | 2/2000 | Chen ......................... | 16/113.1 |
| 6,128,806 A | * | 10/2000 | Shou-Mao ................ | 16/113.1 |
| 6,129,373 A | * | 10/2000 | Cheng ...................... | 280/647 |

* cited by examiner

Primary Examiner—Brian L. Johnson
Assistant Examiner—Bryan Fischmann
(74) Attorney, Agent, or Firm—Joseph M. Lafata; Harness, Dickey & Pierce

(57) ABSTRACT

A single-hand folding device comprises a slidable pressing device having racks, drawing cams having teeth on their peripheries, slidable keys for performing locking operation and wires with one end fixed to the drawing cams and another end fixed to the slidable keys, when the slidable pressing device is displaced with respect to the drawing cams, the racks of the slidable pressing device drive the drawing cams to rotate and the drawing cams draws the wires to pull the slidable keys to a released position so that a baby carriage can be folded.

3 Claims, 2 Drawing Sheets

SINGLE-HANDED FOLDING DEVICE (II)

BACKGROUND OF THE INVENTION

This invention relates to a single-hand folding device. More particularly, it relates to a single-hand folding device of a foldable frame which can be easily folded with one hand.

DESCRIPTION OF THE RELATED ART

For the sake of minimizing the physical volume of baby carriage to facilitate its carrying, e.g. putting it into the trunk to carry by a car, foldable carriages are desired and have been available in the related products. These foldable carriages are often designed to have a locking means so that a firm structure can be sustained after being unfolded for use. One design of the locking means is a trigger-type slidable means which is arranged to be adjacent to the joint portions of the handle frame. When the user wants to fold such kind of foldable carriages, he or she should lower his or her body so as to have two hands simultaneously approach to the trigger-type slidable means, and then press the triggers to release the locking status. Accordingly, these kinds of foldable carriages are somewhat inconvenient in use. In an improved design, a single-hand folding device which has a locking button is arranged at the top portion of the handle frame of the carriage to cooperate with the locking means. To fold this kind of carriage into itself, the user may use one of his or her thumbs to push the locking button and twist the single-hand folding device to draw up two internal wires at both side so that the two internal wires would pull the slidable locking means arranged near the joint portions to a released position. With this single-hand folding device, one may use a single hand to release the locking status of the locking means. However, there are still drawbacks existing in this kind of single-hand folding device. For example, if the locking button is arranged at the left side of the single-hand folding device, it is only suitable to operate this means by right hand, while if the locking button is arranged at the right side, only left hand is available. In addition, the twisting motion is harder for people whose wrists are not so agile.

SUMMARY OF INVENTION

Based on the above aspect, the purpose of this invention is to provide a single-hand folding device which can be easily operated by one single hand and meets the requirements of ergonomics in operation.

To achieve the above purpose, this invention provides a single-hand folding device comprising a slidable pressing means having racks, drawing cams having teeth on their peripheries, slidable keys for performing a locking operation and wires with one end fixed to the drawing cams and another end fixed to the slidable keys, wherein as the slidable pressing means is displaced with respect of the drawing cams, the racks of the slidable pressing means drive the drawing cams to rotate and the rotating drawing cams draw the wires to pull the slidable keys up to an opening position.

In the single-hand folding device according to this invention, a spring is further arranged at the center portion of the slidable pressing means so that a force can be exerted during pressing the slidable pressing means.

In the single-hand folding device according to this invention, the contour of the drawing cams comprises two or more arcs with different diameters, the teeth portion is configured on the arc with smaller diameter and the arc with larger diameter is used to guide the drawn wire.

These and other objects, features and advantageous of the present invention will become more apparent from the following description when taken in conjunction with the accompanying drawings.

Figure 1:
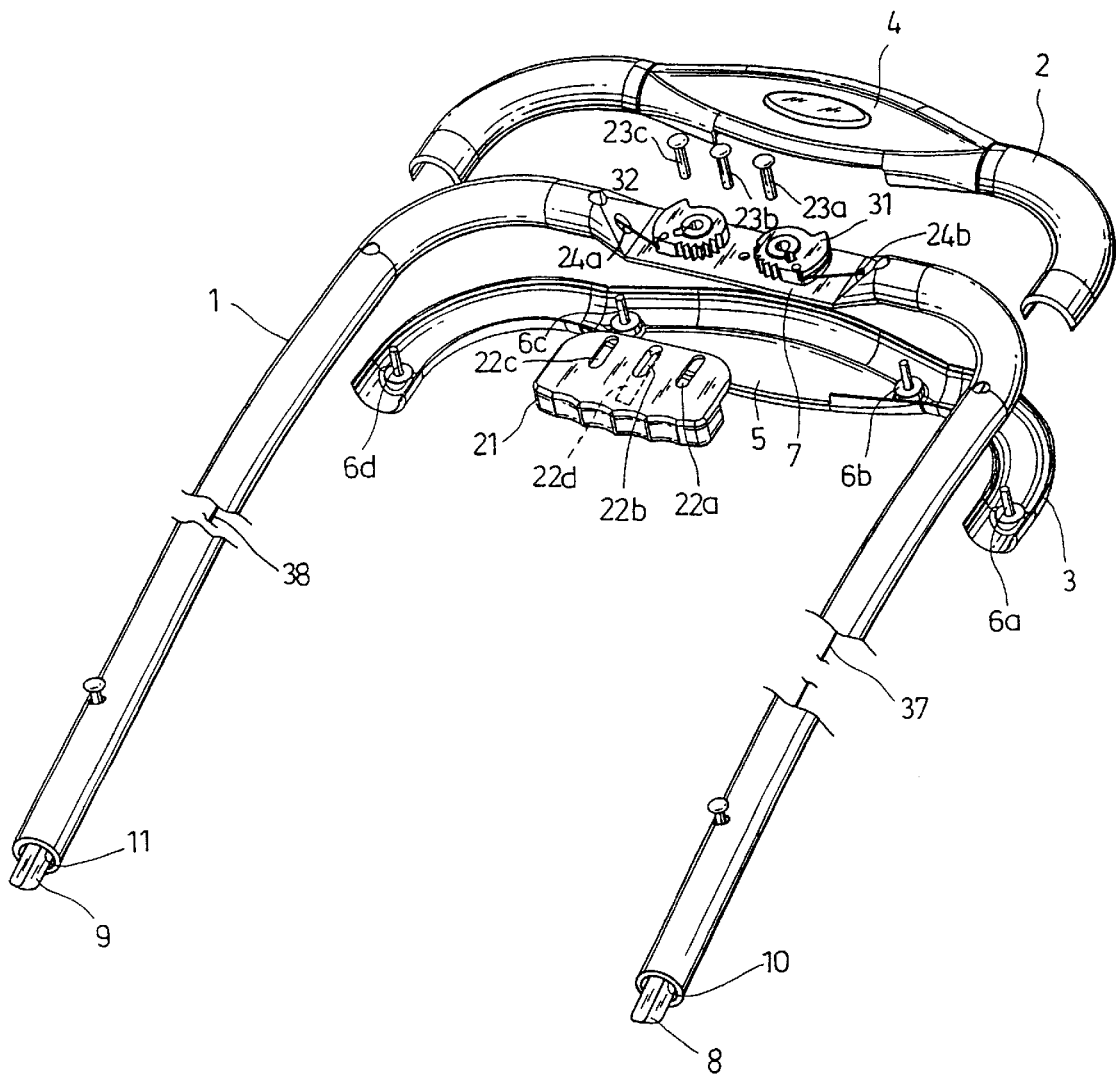
FIG. 1 shows a perspective view of the single-hand folding device according to the present invention.

| List of elements in the drawings | |
|---|---|
| 1 | handle frame |
| 2, 3 | upper and lower handle enclosures |
| 4 | central portion of the handle frame |
| 6a–6d | screws |
| 7 | rectangular plate |
| 8, 9 | slidable keys |
| 10, 11 | openings |
| 21 | slidable pressing means |
| 22a–22c | long holes |
| 22d | center drill |
| 22e | central block |
| 22f | rack portions |
| 22g | spring |
| 23a–23c | rivets |
| 26 | back surface |
| 27 | front surface |
| 28 | side surface |
| 29, 30 | wings |
| 31, 32 | drawing cams |
| 31a | teeth portion |
| 33 | groove |
| 35[, 36] | groove |
| 37, 38 | wires |

DETAILED DESCRIPTION OF THE PREFERRED EMBODIMENT

FIG. 1 shows an explosive view of the single-handed folding device according to this invention. Reference numeral 1 indicates the handle frame 1 of the baby carriage. When the user wants to unfold the baby carriage from its folded status, the handle frame 1 is swung up to a lifting position so that the user may pull the carriage by the handle frame 1. An upper and lower handle enclosures 2 and 3 are mounted on the top portion of the handle frame 1 by screws 6a–6d. The central portion of the handle frame 1 is pressed into a rectangular plate 7 so that an inner space is formed between the plate 7 and the expanding central portion 4 of the handle frame 1. Two drawing cams 31 and 32 with teeth portion are symmetrically arranged on the plate 7 and are rotatably supported by two rivets 23a and 23c. A slidable pressing means 21 is further arranged in the inner space between the plate 7 and the expanding central portion 4 and it constitutes a single-handed folding device together with the above mentioned drawing cams 31 and 32.

Figure 3:
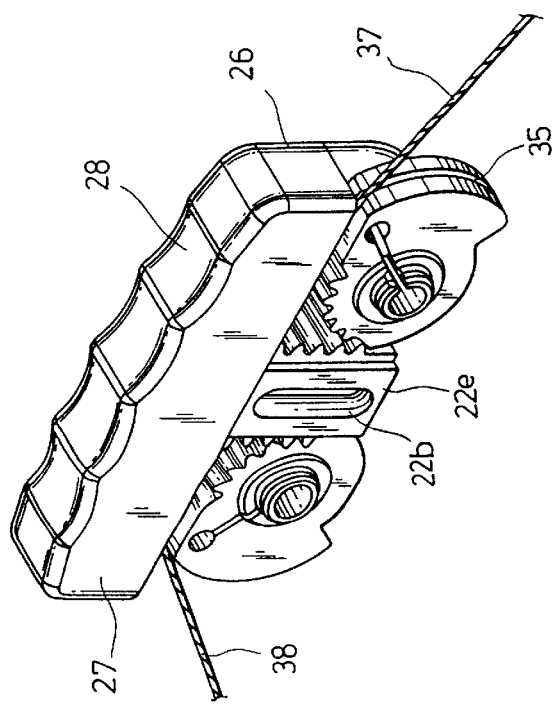
FIG. 3 shows a perspective view of the single-hand folding device according to the present invention.
Figure 2:
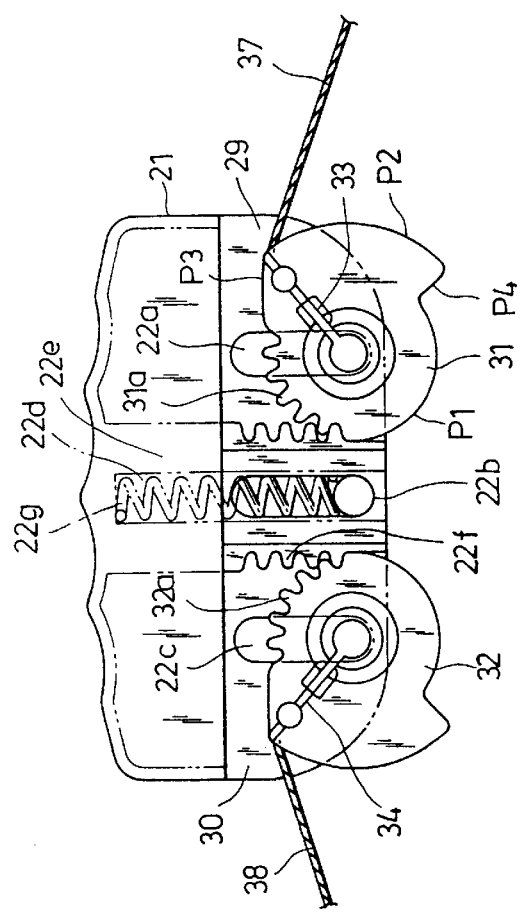
FIG. 2 shows a front view of the single-hand folding device according to the present invention.

Hereafter, the single-hand folding device according to this invention is further explained in detail by referring to FIGS. 2 and 3. FIG. 2 shows a front view of the single-hand folding device of this invention. The single-hand folding device comprises a slidable pressing means 21 and two drawing cams 31 and 32 which are symmetrically arranged at the left and right side of said slidable pressing means 21 respectively. The slidable pressing means 21 has a front surface 27 and a larger back surface 26 and the two surfaces are connected by a wave-shape surface 28. The wave-shape surface 28 is configured with waves so that the user can grasp the slidable pressing means 21 comfortably when the single-hand folding device is folded or the baby carriage is pushed. Furthermore, the central portion of the slidable pressing means 21 is formed with a rectangular central block 22e which extends downward from the center portion of the top side of the wave-shape surface 28 and has its lower end be aligned with the lower edge of the back surface 26. Rack portions 22f are made at the lower two sides of the central block 22e and a center drill 22d inside is formed lengthwise inside the central block 22e for accumulating a spring 22g. As shown in FIG. 3, the surface 27 and the downward extending central block 22e form a T-shape member which separates the larger back surface 26 into two wings 29, 30. Three long holes 22b, 22a and 22c are provided at the lower side of the center block 22e of the slidable pressing means, and the left wing 29 and the right wing 30 respectively corresponding to the horizontal positions of the foregoing rivets 23a and 23c. The rivets 23b, 23a and 23c fixed on the plate 7 of the handle frame 1 can slide through these three long holes 22b, 22a and 22c, so that the slidable pressing means 21 can move with respect of the handle frame 1 in a certain stroke which is defined by the length L of the long holes 22b, 22a and 22c.

As shown in FIG. 2, the contour of the drawing cam 31 comprises two pieces of arcs p1, p2 with different diameters and two transition segments p3, p4 for connecting two pieces of arc p1, p2, wherein the arc p1 with small diameter shares about ($\frac{3}{4}$)π radians and the arc p2 with large diameter shares about ($\frac{1}{4}$)π radians. Teeth portion 31a occupying ($\frac{1}{4}$)π radians is configured at a portion of the periphery of the arc p1 adjacent to the segment p3. The teeth portion 31a can engages with the rack 22f of the center block 22e so that the center block 22e and the drawing cam 31 can operate in coordination and perform linear sliding motion and rotating motion respectively. Since the drawing cams 31 and 32 are configured completely in symmetry, the drawing cam 32 can also operate in coordination with the center block 22e and it rotates in a direction opposite to that of the drawing cams 31 by the teeth portion 32a engaging with the rack 22f. Referring to FIG. 2 and FIG. 3, the drawing cams 31 is further configured with grooves 33 and 35 at its front surface and its arc p2 respectively for guiding a wire 37. The wire 37 has its one end fixed in the opening 33 of the drawing cam 31 and another end connected to a slidable key 8 through a side hole 24b arranged at one side of the plate 7 and the inner portion of the handle frame 1. Similarly, the wire 38 has its one end fixed in the opening 34 of the drawing cam 32 and another end connected to a slidable key 9 through a side hole 24a arranged at the opposite side of the plate 7.

Subsequently, the operating process of the single-hand folding device according to this invention is described in detail. In FIG. 1, the rivets 23a–23c are fixed on the rectangular plate 7 of the handle frame 1, and thus these rivets 23a–23c are static when the single-hand folding device is folded. Referring to FIG. 2, the long holes 22a–23c of the slidable pressing means 21 is displaced downward with respect of the rivets 23a–23c when pressing the slidable pressing means 21 by a single hand. The spring 22g disposed in the inner drill 22d of the center block 22 has its lower end against the rivet 22b, and thus the spring 22 would be compressed when the slidable pressing means 21 is pressed. Accordingly, a certain force can be exerted to conduct the folding operation of the baby carriage. When the center block 22e of the slidable pressing means 21 is displaced downward, the rack portions 22f drives the drawing cams 31, 32 to rotate clockwise and counterclockwise respectively. The sliding stroke of the slidable pressing means 21 is ended once the long holes 22a–22c touch the rivets 23a–23c, and the drawing cams 31, 32 rotate in 90° and 90° respectively during one stroke. As the drawing cams 31, 32 rotate, the wires 37 and 38 are drawn left and right along the grooves (the grove on drawing cam 31 is indicated by numeral reference 35) arranged on the peripheries of the drawing cams 31, 32 whereby the wires 37 and 38 draw the slidable keys 8, 9 back to cause their protruding ends to enter into the openings 10, 11 and the locking status of the slidable keys 8, 9 is released.

While the invention has been described with reference to a preferred embodiment, it will be understood by those skilled in the art that various changes may be made and equivalents may be substituted for elements thereof without departing from the scope of the invention. Therefore, it is intended that the invention will include all embodiments falling within the scope of the appended claims.

What is claimed is:

1. A single-hand folding device comprising a slidable pressing means having racks, drawing cams having teeth on their peripheries, slidable keys and wires with one end fixed to the drawing cams and another end fixed to the slidable keys, wherein as the slidable pressing means is displaced with respect to the drawing cams, the racks of the slidable pressing means drive the drawing cams to rotate and the drawing cams draw the wires to pull the slidable keys.

2. A single-hand folding device according to claim 1, wherein a spring is further arranged at the center portion of said slidable pressing means so that a force needs to be exerted when the slidable pressing means is pressed.

3. A single-hand folding device according to claim 1, wherein the contour of said drawing cams comprises two or more arcs with different diameters, the teeth portion is configured on the arc with the smaller diameter and the arc with the larger diameter is used to guide the drawn wire.

* * * * *